United States Patent
Forsberg et al.

(10) Patent No.: US 9,760,370 B2
(45) Date of Patent: Sep. 12, 2017

(54) LOAD BALANCING USING PREDICTABLE STATE PARTITIONING

(71) Applicant: Oracle International Corporation, Redwood Shores, CA (US)

(72) Inventors: Anders Lars-Goran Forsberg, Karlstad (SE); Terje Strand, San Francisco, CA (US); Binod Pankajakshy Gangadharan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 201 days.

(21) Appl. No.: 14/608,563

(22) Filed: Jan. 29, 2015

(65) Prior Publication Data
US 2016/0226963 A1 Aug. 4, 2016

(51) Int. Cl.
*G06F 9/00* (2006.01)
*G06F 9/46* (2006.01)
*H04L 29/08* (2006.01)

(52) U.S. Cl.
CPC .............. *G06F 9/00* (2013.01); *G06F 9/46* (2013.01); *H04L 67/1004* (2013.01); *H04L 67/28* (2013.01); *H04L 67/101* (2013.01)

(58) Field of Classification Search
None
See application file for complete search history.

(56) References Cited

U.S. PATENT DOCUMENTS

| | | | |
|---|---|---|---|
| 8,762,534 B1 * | 6/2014 | Hong | G06F 9/505 370/389 |
| 2005/0120095 A1 * | 6/2005 | Aman | H04L 67/1008 709/219 |
| 2007/0220302 A1 * | 9/2007 | Cline | G06F 11/2035 714/4.1 |
| 2013/0204917 A1 * | 8/2013 | Wang | G06F 9/52 709/201 |
| 2014/0222893 A1 | 8/2014 | Gangadharan et al. | |
| 2014/0222894 A1 | 8/2014 | Gangadharan et al. | |
| 2014/0222930 A1 | 8/2014 | Gangadharan et al. | |
| 2014/0222957 A1 | 8/2014 | Gangadharan et al. | |
| 2014/0222963 A1 | 8/2014 | Gangadharan et al. | |

* cited by examiner

*Primary Examiner* — Kevin Bates
*Assistant Examiner* — Lesa Kennedy
(74) *Attorney, Agent, or Firm* — Miles & Stockbridge P.C.

(57) ABSTRACT

A system performs load balancing. The system receives a protocol message by a load balancer in communication with a distributed system comprising a server cluster. The system determines a cluster member to process the protocol message, where the cluster member is a member of the server cluster configured to own a state corresponding to the protocol message. The system then forwards the protocol message to the cluster member.

17 Claims, 8 Drawing Sheets

LOAD BALANCING USING PREDICTABLE STATE PARTITIONING

FIELD

One embodiment is directed generally to a communications network, and in particular, to load balancing in a communications network.

BACKGROUND INFORMATION

Enterprise servers are often deployed as a cluster or distributed system to meet high availability and scalability demands of customers. A distributed system may handle network traffic of various protocols and may execute different logics in response to different external protocol messages. Such distributed systems usually require a unified load balancing and failover mechanism, and to that end, may rely on one or more external load balancers to distribute traffic between the members in a cluster. The load balancer is used for distributing load between cluster members, as well as tolerating failures of cluster members by redistributing requests to surviving members when a member has been shut down or becomes unreachable.

A distributed system usually holds one or more state structures in memory. The state structures may correspond to sessions, subscribers, or other stateful entities identified by each protocol message. A state structure is often held in duplicate copies in the memory of a subset of processes running in the distributed system cluster, and each cluster member knows where in the cluster it can find the state. Thus, a protocol message can be received on any cluster member and the receiving member can retrieve the state from the member that owns the state.

SUMMARY

One embodiment is a system that performs load balancing. The system receives a protocol message by a load balancer in communication with a distributed system comprising a server cluster. The system determines a cluster member to process the protocol message, where the cluster member is a member of the server cluster configured to own a state corresponding to the protocol message. The system then forwards the protocol message to the cluster member.

DETAILED DESCRIPTION

Embodiments provide a highly available distributed system that handles different protocol messages and is integrated with one or more load balancers. In one embodiment, based on an externally predictable protocol state partitioning algorithm, an external load balancer distributes various protocol traffic across cluster members in the distributed system. Since the protocol state partitioning is predictable, the load balancer can forward a protocol message to the same cluster member that owns the corresponding state. In another embodiment, the load balancer is static but state partitioning is configured based on a priori knowledge of how the load balancer distributes traffic, such that a protocol message is forwarded to the same cluster member that owns the corresponding state. Therefore, there is no need for copying the state to another cluster member, and embodiments make efficient use of system resources while reducing latency in processing protocol messages.

Figure 1:
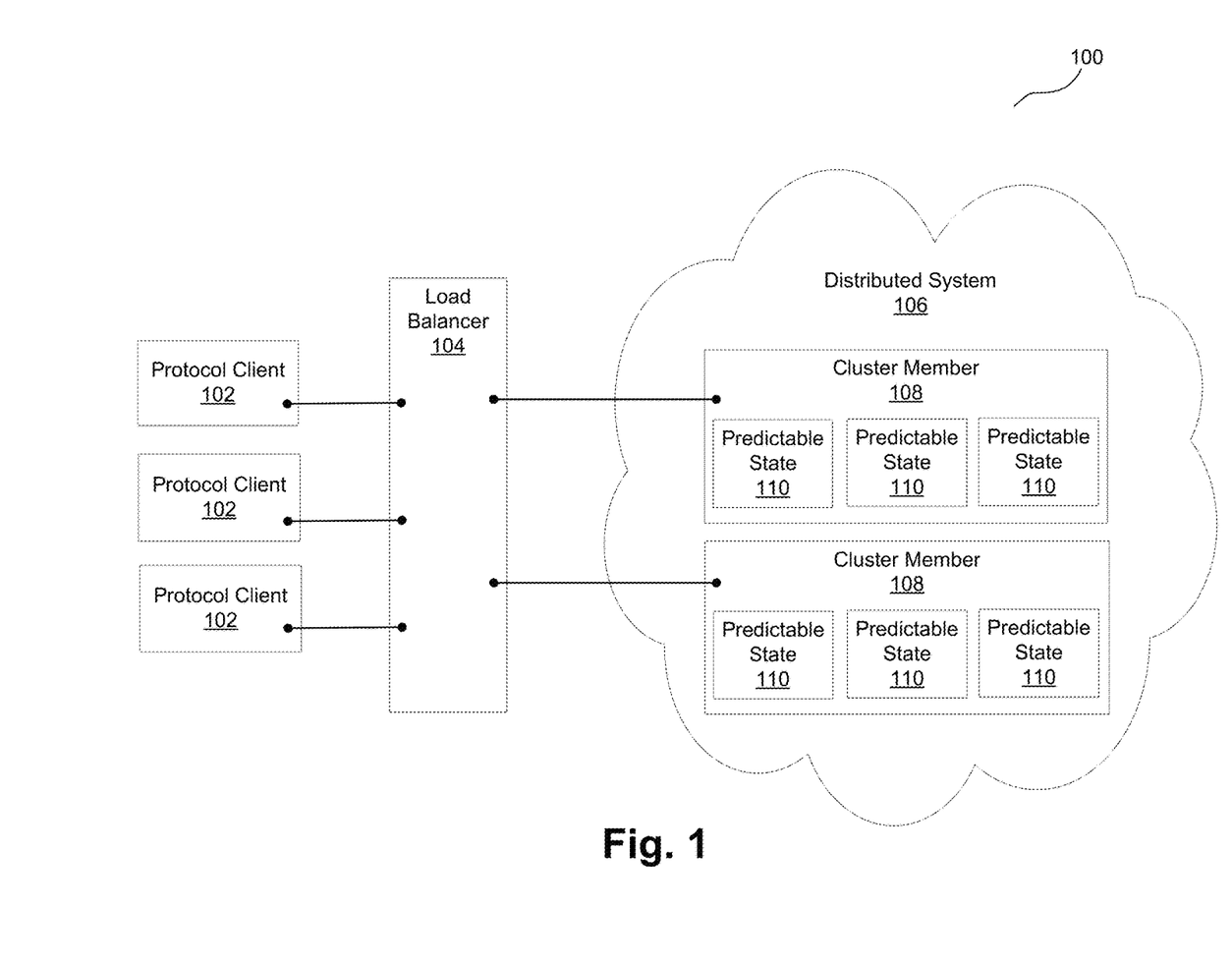
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a distributed system 106 that executes different logics for different external protocol messages. Distributed system 106 may be deployed as an application server or cluster that supports, for example, Session Initiation Protocol ("SIP"), Hypertext Transfer Protocol ("HTTP"), "Diameter," an "extension" protocol, or any other network protocol. SIP is a signaling communications protocol used for controlling multimedia communication sessions such as voice and video calls over Internet Protocol ("IP") networks. HTTP is an application protocol for distributed, collaborative, hypermedia information systems. Diameter is an authentication, authorization, and accounting protocol for computer networks. Extension protocols are provisioned to keep extended clients and servers compatible with standard clients and servers.

Distributed system 106 may rely on one or more external load balancers 104 to distribute traffic between members 108. Load balancer 104 receives external protocol messages from one or more protocol clients 102 operating according to various network protocols, and distributes the received load between members 108. Further, when a member has been shut down or becomes unreachable for some reason, load balancer 104 redistributes the corresponding requests to the surviving members so that distributed system 106 can tolerate failures of members 108.

Figure 2:
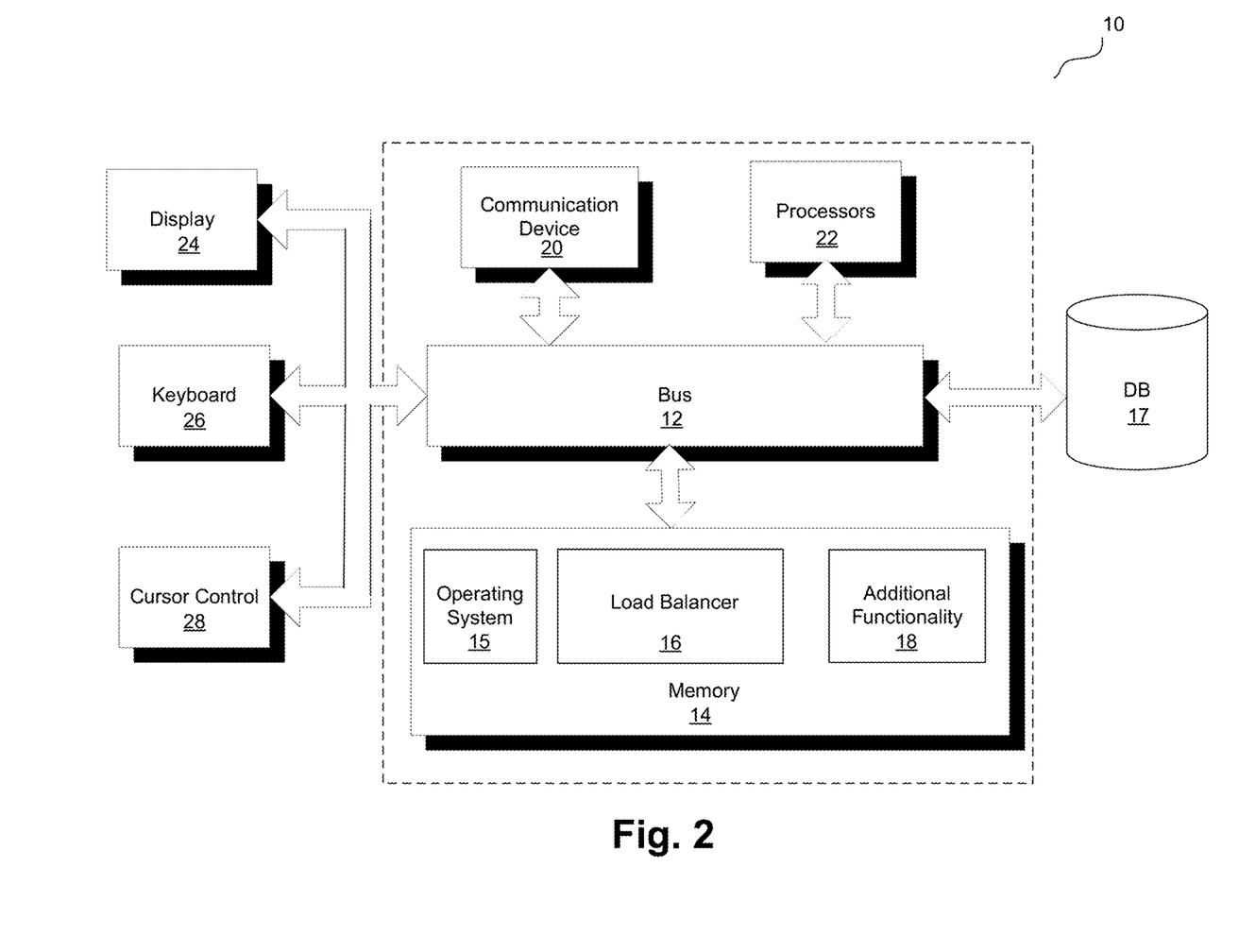
FIG. 2 is a block diagram of a computer server/system in accordance with embodiments of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a load balancer, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include load balancer module 16 for performing load balancing, and all other functionality disclosed herein. System 10 can be part of a larger system, such as added functionality to the "Oracle Communications Converged Application Server" from Oracle Corp. Therefore, system 10 can include one or more additional functional modules 18 to include the additional functionality. A database 17 is coupled to bus 12 to provide centralized storage for modules 16 and 18.

Figure 3:
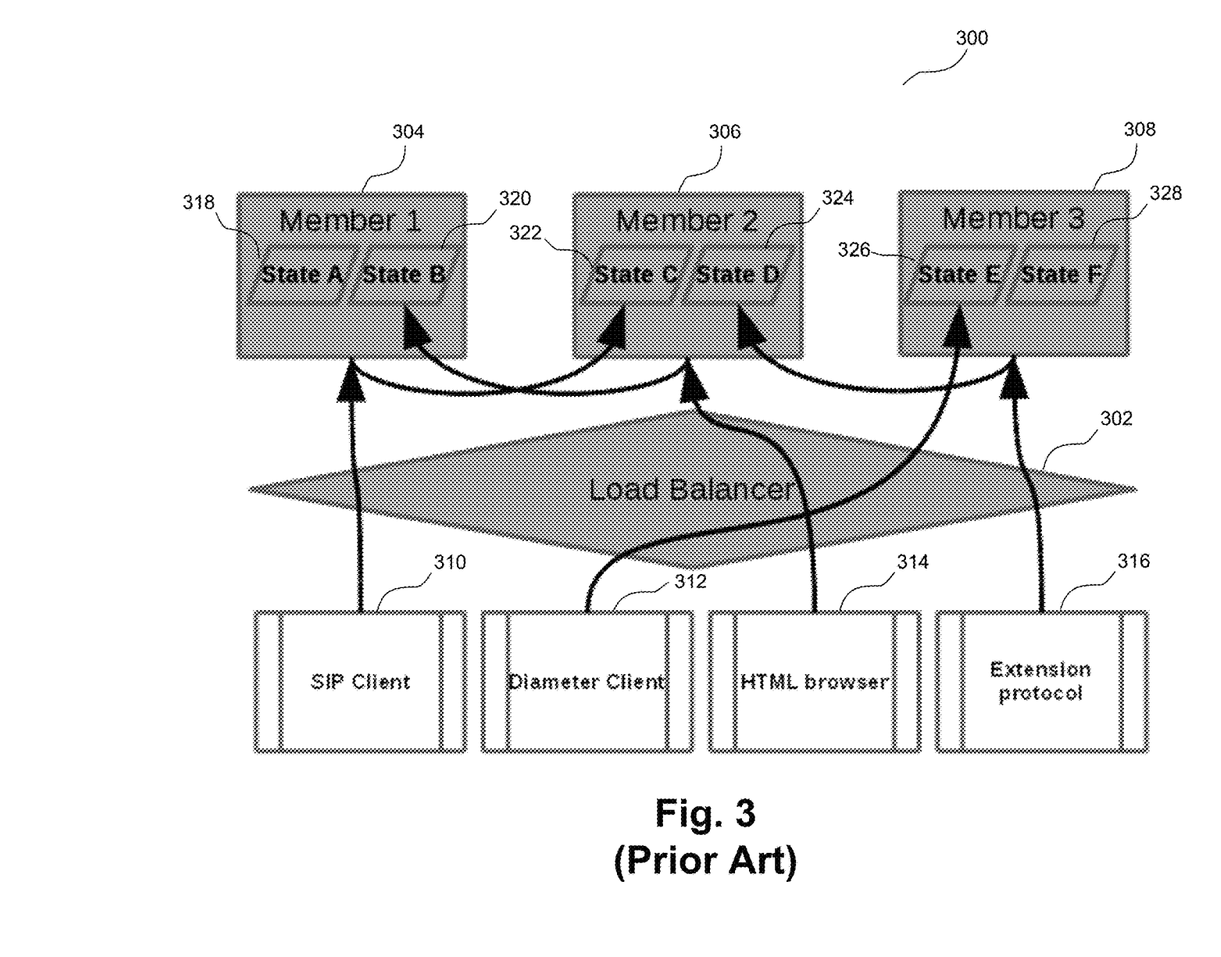
FIGS. 3 and 4 are block diagrams of prior art distributed systems.

With known systems, a distributed system holds one or more state structures related to sessions, subscribers, or other stateful entities identified by each protocol message in the memory. FIG. 3 is a block diagram of a prior art distributed system 300 that implements a load balancer 302 over a cluster that includes a first member 304, a second member 306, and a third member 308. Members 304, 306, 308 handle protocol messages for various protocol clients, such as a SIP client 310, a diameter client 312, an HTML browser 314, and an extension protocol client 316. Each member holds a number of states. For example, first member 304 holds a state A 318 and a state B 320, second member 306 holds a state C 322 and a state D 324, and third member 308 holds a state E 326 and a state F 328. Each state corresponds to a certain protocol/client. For example, state B 320 corresponds to HTML browser 314, state C 322 corresponds to SIP client 310, state D 324 corresponds to external protocol client 316, and state F 326 corresponds to diameter client 312.

Distributed system 300 usually holds a state in duplicate copies in the memory of a subset of processes running in the distributed system cluster, and each cluster member 304, 306, 308, knows where in the cluster it can find the state. Thus, a protocol message can be received on any cluster member 304, 306, 308, and that member can retrieve the state from the member that owns the state (i.e., the owner member). However, implementing this state structure heavily utilizes network, central processing unit ("CPU"), and memory resources, since for a certain percentage of the messages processed, data needs to be copied and transferred from one cluster member to another. The resulting overhead limits the capacity of the hardware and increases the cost for a customer.

One known solution to make more efficient use of network resources and reduce latency is to use a "sticky" load balancing algorithm that is aware of the cluster member to which it has previously forwarded protocol messages of a session. The algorithm then attempts to continue forwarding future messages of that session to the same cluster member. This functionality can be combined with a "near cache" of the state on the member that receives the session messages, thereby avoiding transfer of state data from the owner cluster member for each message. A near cache provides fast read access to Most Recently Used ("MRU") and Most Frequently Used ("MFU") data. It wraps a "front cache" and a "back cache" that automatically and transparently communicates with each other by using a read-through/write-through approach. The "front cache" provides local cache access and is assumed to be inexpensive, fast, and limited in terms of size. The "back cache" can be a centralized or multi-tiered cache that can load-on-demand in case of local cache misses. The "back cache" is complete and correct, has higher capacity, and is more expensive in terms of access speed.

In one example, for a distributed system in a replicated (i.e., highly available) domain, call state storage is implemented using a partitioned distributed "coherence" cache. A coherence cache is a collection of data objects that serve as an intermediary between a database and client applications, and database data may be loaded into the coherence cache and made available to different applications. A coherence cache reduces the load on the database and provides faster access to database data. A partitioned distributed coherence cache is a coherence cache that is divided into several partitions to be distributed/held across several processes/machines. In a distributed system, a coherence cache may be backed up with copies residing at separate cluster member processes/machines, and with a small size limited near cache at the processing member virtual machine.

Figure 4:
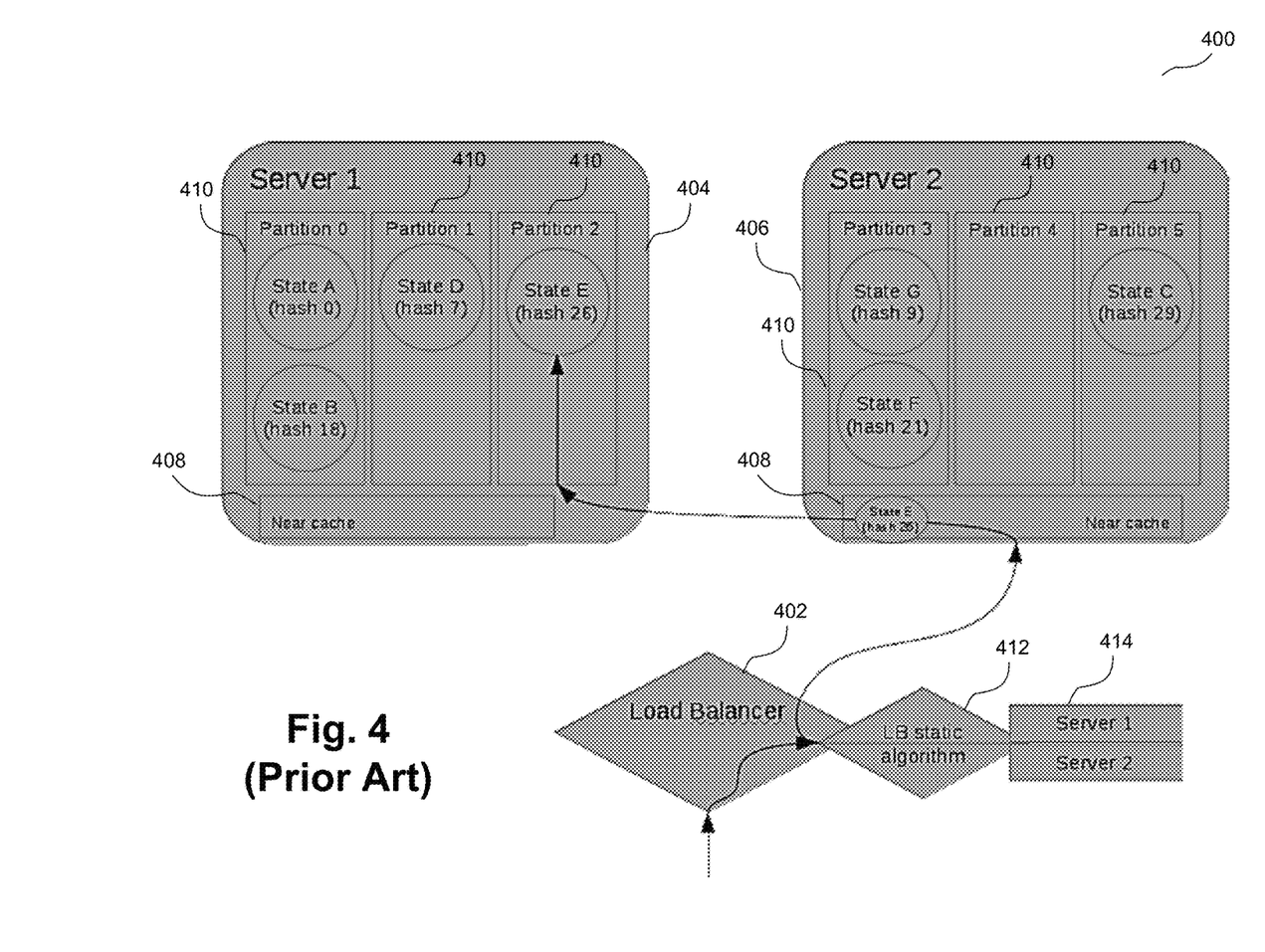

FIG. 4 is a block diagram of a prior art distributed system 400 that implements a sticky load balancer 402 to distribute load over a first server 404 and a second server 406. Sticky load balancer 402 implements a static load balancing algorithm 412 defined over a server set 414 identifying first server 404 and second server 406. In one example, sticky load balancer 402 selects a random target server (e.g., second server 406) on a first message, but continues with that server for the entire session. State partition assignments 410 over first server 404 and second server 406 may be performed on random or based on their load, and a size limited near cache 408 may be optionally used at each server to avoid transferring data for each request.

One disadvantage with this known approach is that another copy of the state needs to be kept in the memory of the cluster, resulting in increased memory utilization. Also, each near cache copy needs to be invalidated and/or updated when the corresponding primary copy is updated. Further, if the state is accessed from more than one cluster member, the state is cached in memory of yet another cluster member, duplicating the state once more. If data consistency needs to be maintained, this causes overhead on all updates of the state. Additionally, only reads of the state are helped by the near cache, while lock, unlock, update, and delete requests still need to be handled on the owner member. Also, a load balancer is usually unaware of the relation between different sessions (especially across different protocols), or how target servers distribute and manage the state related to the requests being directed to them.

In contrast to the known solutions, embodiments of the present invention implement the execution logic of a protocol message at the same cluster member where the state resides. Embodiments align the algorithms that determine to which member each state is allocated and to which member a protocol message is forwarded, such that protocol messages are forwarded to the owner member. Accordingly, there is no need for copying and transferring the state from one member to another, and embodiments achieve lower memory usage and latency. Further, embodiments can lock, read, modify, remove, and unlock the state more quickly and with lower overhead compared to when protocol messages are sent to one member but the state resides on another member (which may be another physical machine in the network). Thus, embodiments reduce network, CPU, and memory utilization and increase the capacity of the hardware due to reduced overhead, thus lowering the cost for a customer.

Referring again to FIG. 1, one embodiment provides a predictable algorithm for determining which cluster member (or members) is allocated each state. Thus, each cluster member 108 holds one or more predictable states 110. Accordingly, since the state assignment is predictable, an external system (e.g., load balancer 104) can inspect a protocol message and based on one or more parameters in the message determine which cluster member 108 is configured to own the state corresponding to the protocol message session, subscriber, or stateful entity. Alternatively or additionally, embodiments allow the predictable algorithm to be modified (e.g., using a pluggable or configurable interface) such that the decision function of distributed system 106 is conformed to an external decision process already existing in load balancer 104.

Further, in embodiments where there is a logical relation between two different states (e.g., when sending and/or receiving messages in a session belonging to one protocol while sending and/or receiving messages in another session belonging to the same or a different protocol), the two states may also be co-located at the same cluster member, if possible, and the predictable algorithm may be configured such that messages belonging to both states are sent directly to that member.

In one embodiment implemented in a server deployment in a distributed/replicated combined tier topology, an externally predictable session state partitioning and assignment scheme defines which field/value in any protocol message is used, and how it is processed, to determine which engine in the cluster is configured to host the related session state. A distributed topology is spread out over multiple members, e.g., more or less equivalent to a partitioned topology. A replicated topology provides multiple copies to avoid a single point of failure, e.g., provides one primary copy and one or more backup copies. In a combined tier topology, each member includes both processing engine components and state data storage components.

In one embodiment, the predictable algorithm is applied to the new sessions in a steady state where all engines in the cluster are up and running. In one embodiment, the predictable algorithm is used by a load balancer plugin to calculate where it should send each protocol message in order to reduce the number of network hops, thus improving performance and reducing network communication.

For example, if the load balancer does not use the predictable algorithm to calculate where it should send each protocol message, the message may be sent to a processing node that is not the primary copy owner. This node sends a network message to the primary copy owner node, asking to acquire lock and retrieve the state object. The owner node updates lock status and returns the state data over the network to the processing node. The processing node executes application logic, makes updates to the state data, and sends a network message to the primary copy owner node with new state data, asking to save and release the lock. The owner node saves the new data and updates lock status, returning an acknowledgement to the processing node. However, when the load balancer uses the predictable algorithm to calculate where it should send each protocol message, the message is sent directly to the processing node which is also the primary copy owner node. The processing/owner node updates lock status, retrieves the state object from local memory, executes application logic, make updates to the state data, saves the new data, and updates lock status in local memory.

Figure 5:
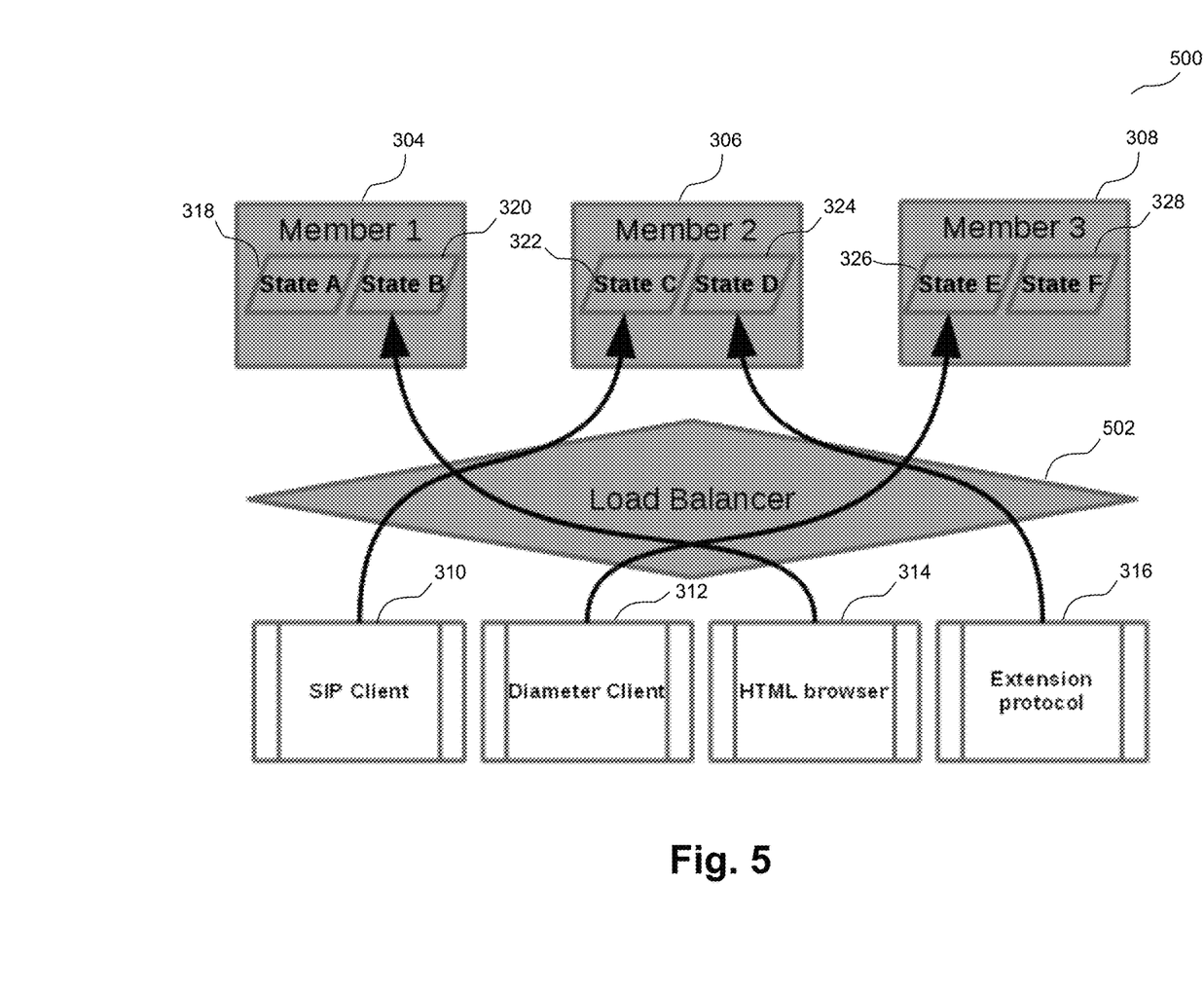
FIGS. 5-7 are block diagrams of distributed systems in accordance with embodiments of the present invention.

FIG. 5 is an example block diagram of a distributed system 500 in accordance with embodiments of the present invention. Distributed system 500 includes first member 304, second member 306, third member 308, SIP client 310, diameter client 312, HTML browser 314, and extension protocol client 316, as described herein with reference to FIG. 3. However, distributed system 500 implements a load balancer 502 according to embodiments of the present invention such that each protocol message is forwarded to the corresponding owner member. For example, load balancer 502 forwards protocol messages of HTML browser 314 to first member 304 that holds state B 320 corresponding to HTML browser 314. Similarly, state C 322 corresponds to SIP client 310 and therefore load balancer 502 forwards protocol messages of SIP client 310 to second member 306. Second member 306 also holds state D 324 corresponding to extension protocol 316, therefore load balancer 502 forwards protocol messages of extension protocol 316 to this member as well. Finally, state E 326 corresponds to diameter client 312 and is held by third member 308 so load balancer 502 forwards protocol messages of diameter client 312 to this member.

Figure 6:
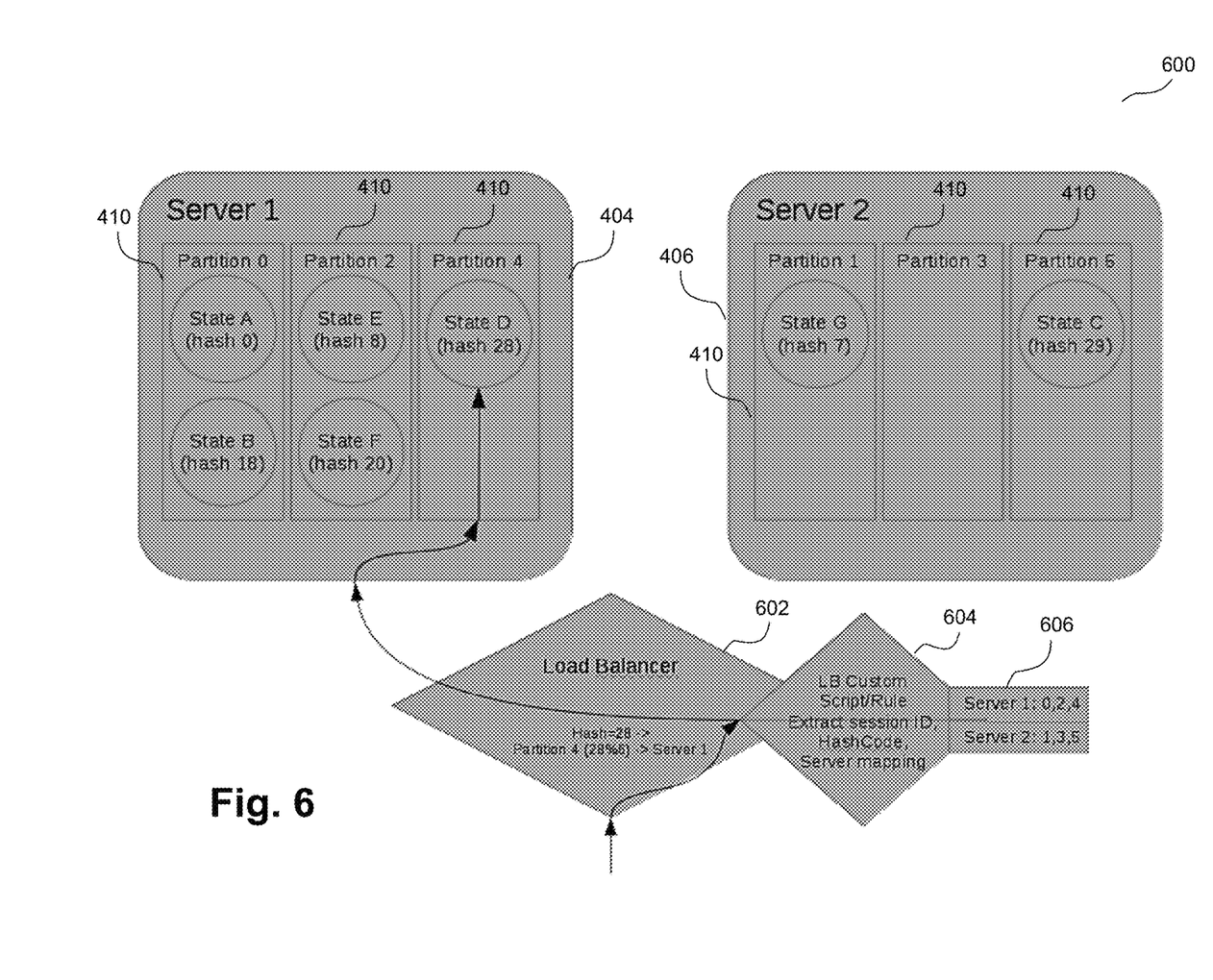

FIG. 6 is an example block diagram of a distributed system 600 according to one optional embodiment. Distributed system 600 includes first server 404, second server 406, and corresponding partition assignments 410, as described herein with reference to FIG. 4. However, distributed system 600 implements an extensible load balancer 602 that supports customization 604 to modify the algorithm that selects a target server based on protocol message content. Load balancer customization 604 can inspect a message and based on a predictable partitioning algorithm in distributed system 600 (e.g., as reflected via partitioning data 606) select the server that is known to hold the related state in memory as the target server for the message. For example, load balancer customization 604 may inspect protocol messages and select a target server by mapping a server to a session identifier ("ID") or a hash value of the protocol message. For example, if a protocol message has a hash value of 28 and there are a total of 6 partitions, the partition corresponding to this hash value is partition 4, and based on partitioning data 606, the target server is first server 404.

Figure 7:
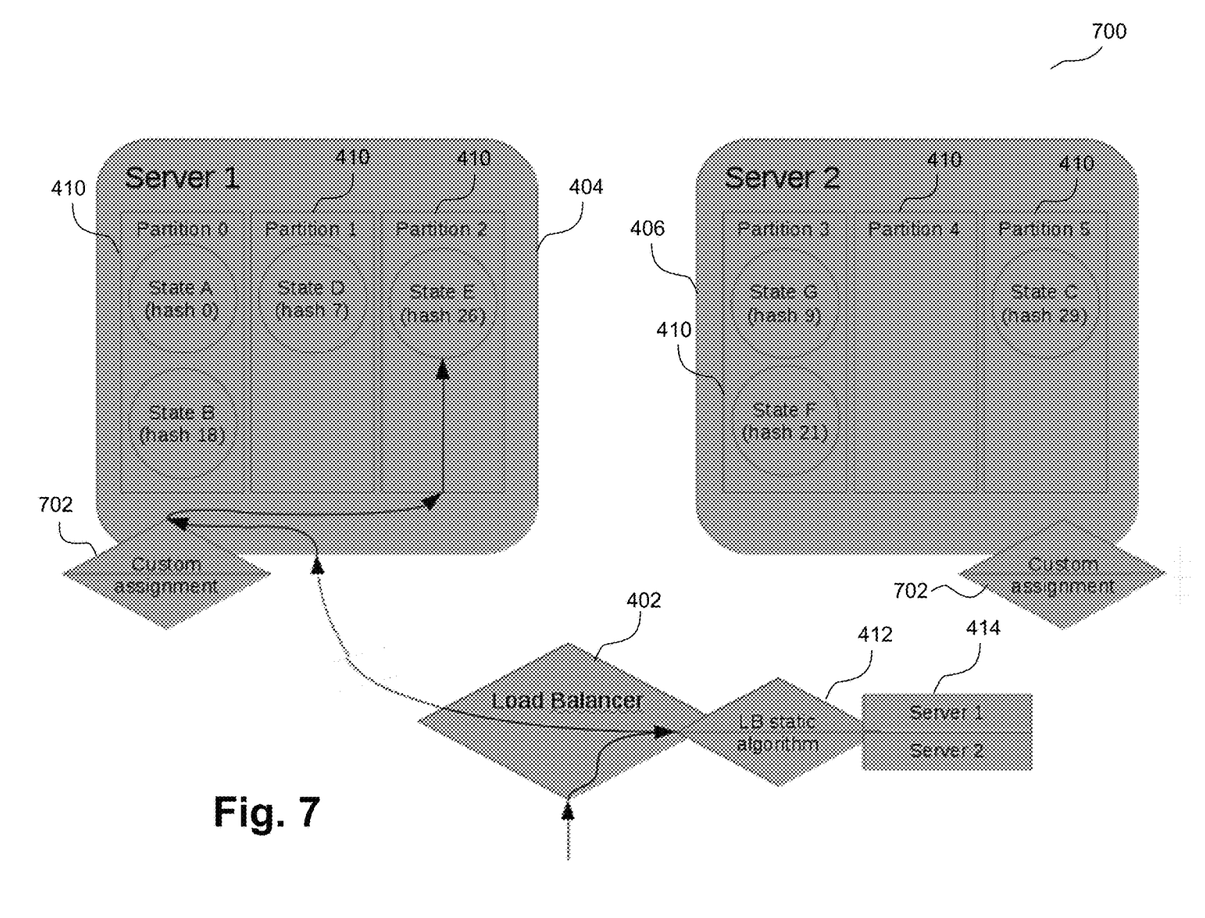

FIG. 7 is an example block diagram of a distributed system 700 according to another optional embodiment. Distributed system 700 includes first server 404, second server 406, partition assignments 410, load balancer 402, and static load balancing algorithm 412 defined over server set 414, as described herein with reference to FIG. 4. However, distributed system 700 is configured such that each protocol message is forwarded to the corresponding owner member even when load balancer 402 cannot be customized and a conventional/known algorithm is used to select the target server based on protocol message content. For example, when load balancer 402 is a static load balancer that selects a target server using predefined message content, the partition assignment may be customized 702 to assign partitions and state entries to that targeted server. Accordingly, distributed system 700 supports a configurable and/or customizable partitioning and partition selection algorithm that aligns the partitioning with the load balancer selection algorithm. Therefore, this embodiment achieves a static but predictable load balancer.

One embodiment determines how partitions are assigned to servers, how call state keys are assigned to partitions, and how call state keys are generated from protocol messages such as SIP messages. In one embodiment, in order to determine a partition assignment, an ordered list of server names is determined based on domain configuration (e.g., a predefined configuration of network addresses used by the load balancer to communicate with each member in the cluster in combination with a server name that identifies each such member/address). The ordered list may include, for example, managed servers that are enabled for coherence call state storage, based on, for example, target for call state storage grid archives ("GAR") deployable or any other mechanism. GAR is a deployment artifact type supported by WebLogic Server. It is similar in purpose to a Web ARchive ("WAR"), but used with coherence cache application components. After determining the ordered list of server names, the total set of available partitions in the call state cache service is divided into sections holding an equal number of partitions (or as close to equal as possible), and each such section is assigned to a corresponding server as ordered in the sorted server name list when the "owning" server is running. This provides an externally predictable partition assignment for each of the running servers, and when a server is not running, the storage section it normally holds is temporarily spread out among the other servers.

For example, one embodiment keeps an ordered list of known cluster members/engines (whether running or not) and divides the number of service partitions by the number of servers in the list. Assuming the rounded down result of this division is "n+1," the first "n+1" partitions (e.g., partitions "0 . . . n") are assigned to section 1, and so on. Each section "i" then holds the partitions with ID [i n . . . i n+n]. Each section "i" is assigned to the server with the same index (i.e., server "i"). If a server that is configured to hold a storage section is not running, each partition in the orphaned section is assigned to one of the running members. To avoid unbalanced load, each member is assigned an equal number of partitions (or as close to equal as possible), for example, by assigning each orphaned partition to the running servers in a round robin manner. One embodiment implements a coherence partition assignment algorithm extension (i.e., changing the algorithm by plugging in custom code) in combination with using domain configuration to determine which storage enabled engine nodes exist in the cluster, listening to changes of this configuration, and monitoring server states using coherence service application programming interfaces ("APIs").

In one embodiment where a deployed load balancer does not have an extension or pluggable interface to control how it distributes traffic among endpoints, a plugin API may be provided to implement a partition scheme or extension aligned with the existing load balancing algorithm and the distribution of partitions over the cluster members. Such pluggable partition assignment can control how protocol state keys are mapped to partitions. A state key is a unique identifier that is used to locate any state data entry in the cluster. It is normally derived from part of each protocol message that remains identical and exists in all messages throughout the scope/life of the state data (e.g., session). Examples can be session, subscriber, or call identifier, and the state key would then be this identifier "as is" or the result of processing this identifier, e.g., the result of a one-way hashing algorithm configured to yield a unique result and an equivalent result when repeated with the same input.

In one embodiment, one or more fields/contents in a protocol message are used to generate a state key, that may be used to locate the session state required to process the message and the potential session it belongs to. Embodiments provide a mechanism for generation of call state key for each protocol that requires support for predictable partitioning. For example, when a SIP message arrives at a SIP stack, a call state ID may be generated by checking one or more conditions indicating, for example, an initial request with a join/replaces header, an initial request with a session key, an initial request with an encode uniform resource identifier ("URI"), a normal initial request, a subsequent request with an application parameter, a hop by hop subsequent request, a subsequent request with a SIP application session ID parameter from a popped route URI if the top route has been popped, a subsequent request with a SIP application session ID parameter from a top route loose routing ("LR") parameter or a request URI, or a subsequent request with a call ID header. In one embodiment, key partitioning is performed by calculating a hash value using the call state key, and assigning the hash value to the partition whose ID is equal to the rounded down result of the hash value divided by the total number of partitions.

In one embodiment, the distributed system may be in an operational mode such as "full cluster," "partial cluster," "starting/stopping engines," and "adding/removing engines." "Full cluster" is an operational mode where all members/engines in the cluster are running. In this mode, each partition resides on the owning member/engine, and it is externally predictable where a session state created from a protocol message that supports predictable partitioning resides.

"Partial cluster" is an operational mode where some members/engines in the cluster are not running. In this mode, the partitions that would be normally hosted on one of the non-running members are hosted on one of the other members/engines in the cluster. In this mode, it may not be possible to determine from outside of the cluster which member is hosting the partition. Thus, a load balancer should send the message to another member/engine, which may cause extra network traffic to lock/unlock and read/write the state if it lands on a non-hosting member/engine. Nevertheless, this mode operates as if the original hosting engine had been running.

"Starting/stopping engines" is an operational mode where a member/engine is started or stopped (i.e., joins or leaves the cluster). In this mode, the partitions owned by the started/stopped server move to/from it, causing extra network traffic until the system stabilizes.

"Adding/removing engines" is an operational mode where an engine is added or removed from the cluster. In this mode, partitions need to be rebalanced as the owner may change when the cluster size change. This may cause extra network traffic at the time of the cluster change when partitions move around between servers, but the extra traffic is temporary and only upon occasional configuration changes.

Figure 8:
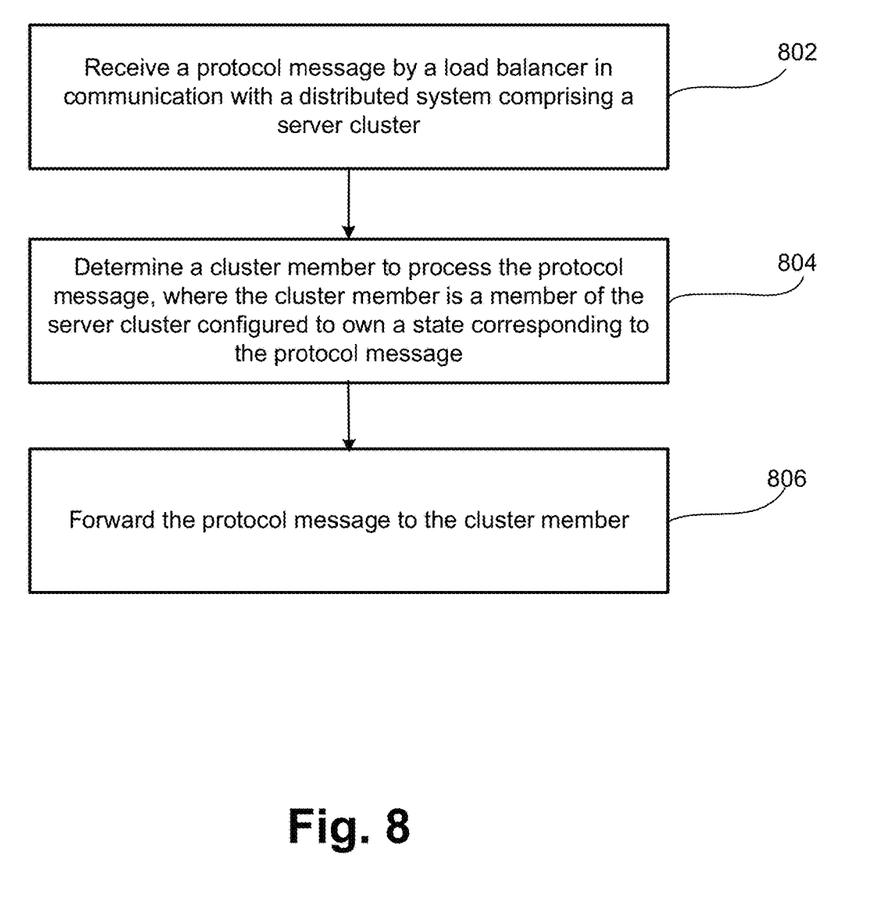
FIG. 8 is a flow diagram of the operation of a load balancer module of FIG. 2 when performing load balancing in accordance with embodiments of the present invention.

FIG. 8 is a flow diagram of the operation of load balancer 104 of FIG. 1 and/or load balancer module 16 of FIG. 2 when performing load balancing in accordance with embodiments of the present invention. In one embodiment, the functionality of the flow diagram of FIG. 8 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 802, load balancer 104 receives a protocol message. In one embodiment, load balancer 104 is in communication with distributed system 106 that has a distributed and replicated combined tier topology. Distributed system 106 implements a session state partitioning and assignment algorithm over a server cluster such that based on one or more parameters in each protocol message, the session state partitioning and assignment algorithm identifies which member of the server cluster is configured to own a corresponding state. That is, cluster members 108 hold externally predictable states 110.

At 804, load balancer 104 determines a cluster member to process the protocol message, where cluster member configured to own a state corresponding to the protocol message. In one optional embodiment, load balancer 104 determines the cluster member based on a priori knowledge of the session state partitioning and assignment algorithm such that the cluster member is the member of the server cluster configured to own the state corresponding to the protocol message. In another optional embodiment, the session state partitioning and assignment algorithm is configured based on a priori knowledge of a decision algorithm of load balancer 104 such that the cluster member is the member of the server cluster configured to own the state corresponding to the protocol message. In one embodiment, the session state partitioning and assignment algorithm keeps an ordered list of cluster members 108 and divides a total number of partitions by a total number of servers in the ordered list to determine a number of partitions assigned to each cluster member. In one embodiment, when a server that is configured to hold one or more partitions is not running, the one or more partitions are assigned to one or more running servers in a round robin manner.

At 806, load balancer 104 forwards the protocol message to the cluster member, i.e., the owner member.

As disclosed, embodiments provide load balancing for a highly available distributed system that handles different protocol messages. In one embodiment, based on an externally predictable protocol state partitioning algorithm, an external load balancer distributes various protocol traffics across cluster members in the distributed system such that protocol messages are forwarded to the same cluster member that owns the corresponding state. In another embodiment, the load balancer is static but state partitioning is configured based on a-priori knowledge of how the load balancer distributes traffic, such that a protocol message is forwarded to the same cluster member that owns the corresponding state. Therefore, there is no need for copying the state to another cluster member, and embodiments make efficient use of system resources while reducing latency in processing protocol messages.

Further, embodiments avoid having to do remote invocations for lock/read and write/unlock operations, as the processing will be done on the member (e.g., the Java virtual machine) that holds the primary copy of the call state.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform load balancing for a distributed system including a server cluster having a number of cluster members, each cluster member having a number of partitions, each partition storing a plurality of states, each state corresponding to a certain protocol client, the performing comprising:
   receiving, over a network, a protocol message from a protocol client;
   determining which cluster member owns a state corresponding to the protocol client, including:
      generating a state key based on the protocol message, the state key being a session, subscriber, or call identifier,
      calculating a one-way hash of the state key,
      determining a partition in which the state corresponding to the protocol client is stored based on the one-way hash of the state key and a total number of partitions equal to the sum of the number of partitions for each cluster member, and
      determining an owner cluster member on which the partition resides based on cluster member partitioning data, including rounding down a result of dividing the one-way hash of the state key by the total number of partitions; and
   forwarding, over the network, the protocol message to the owner cluster member.

2. The non-transitory computer-readable medium of claim 1, wherein the distributed system implements a session state partitioning and assignment algorithm over the server cluster, wherein, based on one or more parameters in each protocol message, the session state partitioning and assignment algorithm identifies which member of the server cluster is configured to own a corresponding state.

3. The non-transitory computer-readable medium of claim 2, wherein the load balancer determines the cluster member based on a priori knowledge of the session state partitioning and assignment algorithm such that the cluster member is the member of the server cluster configured to own the state corresponding to the protocol client.

4. The non-transitory computer-readable medium of claim 2, wherein the session state partitioning and assignment algorithm is configured based on a priori knowledge of a decision algorithm of the load balancer such that the cluster member is the member of the server cluster configured to own the state corresponding to the protocol client.

5. The non-transitory computer-readable medium of claim 2, wherein the session state partitioning and assignment algorithm keeps an ordered list of cluster members and divides a total number of partitions by a total number of servers in the ordered list to determine a number of partitions assigned to each cluster member.

6. The non-transitory computer-readable medium of claim 2, wherein, when a server that is configured to hold one or more partitions is not running, the one or more partitions are assigned to one or more running servers in a round robin manner.

7. A method of load balancing for a distributed system including a server cluster having a number of cluster members, each cluster member having a number of partitions, each partition storing a plurality of states, each state corresponding to a certain protocol client, the method comprising:
   receiving, over a network, a protocol message from a protocol client;

determining which cluster member owns a state corresponding to the protocol client, including:
  generating a state key based on the protocol message, the state key being a session, subscriber, or call identifier,
  calculating a one-way hash of the state key,
  determining a partition in which the state corresponding to the protocol client is stored based on the one-way hash of the state key and a total number of partitions equal to the sum of the number of partitions for each cluster member, and
  determining an owner cluster member on which the partition resides based on cluster member partitioning data, including rounding down a result of dividing the one-way hash of the state key by the total number of partitions; and
forwarding, over the network, the protocol message to the owner cluster member.

8. The method of claim 7, wherein the distributed system implements a session state partitioning and assignment algorithm over the server cluster, wherein, based on one or more parameters in each protocol message, the session state partitioning and assignment algorithm identifies which member of the server cluster is configured to own a corresponding state.

9. The method of claim 8, wherein the load balancer determines the cluster member based on a priori knowledge of the session state partitioning and assignment algorithm such that the cluster member is the member of the server cluster configured to own the state corresponding to the protocol message.

10. The method of claim 8, wherein the session state partitioning and assignment algorithm is configured based on a priori knowledge of a decision algorithm of the load balancer such that the cluster member is the member of the server cluster configured to own the state corresponding to the protocol message.

11. The method of claim 8, wherein the session state partitioning and assignment algorithm keeps an ordered list of cluster members and divides a total number of partitions by a total number of servers in the ordered list to determine a number of partitions assigned to each cluster member.

12. The method of claim 8, wherein, when a server that is configured to hold one or more partitions is not running, the one or more partitions are assigned to one or more running servers in a round robin manner.

13. A system, comprising:
  a distributed system, coupled to a network, including a server cluster having a number of cluster members, each cluster member having a number of partitions, each partition storing a plurality of states, each state corresponding to a certain protocol client; and
  a load balancer, coupled to the network, including a memory storing instructions, and a processor, coupled to the memory, having instructions stored thereon that, when executed by the processor, cause the processor to perform load balancing for the distributed system, including:
    receiving, over the network, a protocol message from a protocol client;
    determining which cluster member owns a state corresponding to the protocol client, including:
      generating a state key based on the protocol message, the state key being a session, subscriber, or call identifier,
      calculating a one-way hash of the state key,
      determining a partition in which the state corresponding to the protocol client is stored based on the one-way hash of the state key and a total number of partitions equal to the sum of the number of partitions for each cluster member, and
      determining an owner cluster member on which the partition resides based on cluster member partitioning data, including rounding down a result of dividing the one-way hash of the state key by the total number of partitions, and
    forwarding, over the network, the protocol message to the owner cluster member.

14. The system of claim 13, wherein the distributed system implements a session state partitioning and assignment algorithm over the server cluster, wherein, based on one or more parameters in each protocol message, the session state partitioning and assignment algorithm identifies which member of the server cluster is configured to own a corresponding state.

15. The system of claim 14, wherein the load balancer determines the cluster member based on a priori knowledge of the session state partitioning and assignment algorithm such that the cluster member is the member of the server cluster configured to own the state corresponding to the protocol message.

16. The system of claim 14, wherein the session state partitioning and assignment algorithm is configured based on a priori knowledge of a decision algorithm of the load balancer such that the cluster member is the member of the server cluster configured to own the state corresponding to the protocol message.

17. The system of claim 14, wherein the session state partitioning and assignment algorithm keeps an ordered list of cluster members and divides a total number of partitions by a total number of servers in the ordered list to determine a number of partitions assigned to each cluster member.

* * * * *

UNITED STATES PATENT AND TRADEMARK OFFICE
CERTIFICATE OF CORRECTION

PATENT NO. : 9,760,370 B2
APPLICATION NO. : 14/608563
DATED : September 12, 2017
INVENTOR(S) : Forsberg, et al.

It is certified that error appears in the above-identified patent and that said Letters Patent is hereby corrected as shown below:

In the Claims

In Column 12, Line 8, in Claim 13, delete "client;" and insert -- client, --, therefor.

Signed and Sealed this
Seventh Day of August, 2018

Andrei Iancu
*Director of the United States Patent and Trademark Office*